United States Patent [19]  [11]  4,314,046
Ueno et al.  [45]  Feb. 2, 1982

[54] PROCESS FOR THE STEREOREGULAR POLYMERIZATION OF α-OLEFINS IN THE PRESENCE OF A SUPPORTED TITANIUM CATALYST

[75] Inventors: Hiroshi Ueno, Namekawa; Masafumi Imai; Naomi Inaba, both of Ooi; Makoto Yoda, Kawagoe; Shozo Wada, Zushi, all of Japan

[73] Assignee: Toa Nenryo Kogyo Kabushiki Kaisha, Tokyo, Japan

[21] Appl. No.: 172,797

[22] Filed: Jul. 28, 1980

Related U.S. Application Data

[62] Division of Ser. No. 29,081, Apr. 11, 1979, Pat. No. 4,242,230.

[30] Foreign Application Priority Data

Apr. 12, 1978 [JP] Japan .................................. 53-42147

[51] Int. Cl.$^3$ .............................................. C08F 4/64
[52] U.S. Cl. .............................. 526/125; 252/429 B; 526/348; 526/351
[58] Field of Search ......................................... 526/125

[56] References Cited

U.S. PATENT DOCUMENTS

| 3,094,568 | 6/1963 | Hay et al. | 252/429 B X |
| 4,107,412 | 8/1978 | Welch | 252/429 B X |
| 4,107,413 | 8/1978 | Giannini et al. | 526/114 |
| 4,107,414 | 8/1978 | Giannini et al. | 526/114 |
| 4,107,415 | 8/1978 | Giannini et al. | 252/429 B X |
| 4,146,502 | 3/1979 | Yokoyama et al. | 252/429 B X |
| 4,156,063 | 5/1979 | Giannini et al. | 526/114 |
| 4,182,691 | 1/1980 | Ueno et al. | 252/429 B |
| 4,187,196 | 2/1980 | Giannini et al. | 252/429 B |
| 4,210,738 | 7/1980 | Hermans et al. | 526/152 |
| 4,226,741 | 10/1980 | Luciani et al. | 252/429 B |
| 4,226,963 | 10/1980 | Giannini et al. | 526/114 |
| 4,242,230 | 12/1980 | Ueno et al. | 252/429 B |

FOREIGN PATENT DOCUMENTS 2326429 4/1977 France .
1492618 11/1977 United Kingdom .
1563720 3/1980 United Kingdom .

Primary Examiner—Stanford M. Levin
Attorney, Agent, or Firm—M. B. Kurtzman

[57] ABSTRACT

A supported titanium catalyst, adaptable for use in the stereoregular polymerization of α-olefins, is produced by treating a supported titanium-containing solid, obtained by cogrinding a magnesium halide, tetravalent titanium halide and organic acid ester, with a hydrocarbon, organo halogen compound or mixture thereof with heating. The resulting supported titanium catalyst, when employed as a titanium component with an organo aluminum catalyst component for the catalyst system in a process for stereoregular polymerization of α-olefins, produces high polymerization activity and unexpectedly high stereoregular polymer yielding ratios.

8 Claims, 2 Drawing Figures

PROCESS FOR THE STEREOREGULAR POLYMERIZATION OF α-OLEFINS IN THE PRESENCE OF A SUPPORTED TITANIUM CATALYST

This is a division of application Ser. No. 29,081, U.S. Pat. No. 4,242,230, issued Dec. 30, 1980, filed Apr. 11, 1979.

BACKGROUND OF THE INVENTION

This invention relates to a catalyst component for use in the polymerization of α-olefins and to a process for the polymerization of α-olefins using the same, and more particularly, it is concerned with a supported titanium catalyst component prepared by an improved process and with a process for producing a stereoregular homopolymer or copolymer of α-olefins using a catalyst system comprising the supported titanium catalyst component and an organo aluminum catalyst component.

For the stereoregular polymerization of α-olefins, it has hitherto been carried out to use a catalyst system comprising solid $TiCl_3$, obtained by reducing $TiCl_4$ by various methods, and an organo aluminum compound as cocatalyst. However, this method has many disadvantages on a commercial scale in that both the polymerization activity and stereoregularity of commercially available catalyst systems are low and steps for polymer deashing and for removing amorphous polymers are required. In order to overcome these disadvantages, there have been proposed processes for the polymerization of α-olefins by the use of catalyst systems comprising, by way of example, titanium catalytic components obtained by treating solids, obtained by reducing $TiCl_4$ with organo aluminum compounds, with complexing agents and then with $TiCl_4$ (U.S. Pat. No. 4,210,738 of Hermans et al, issued July 1, 1980); or by treating the solids with complexing agents and hexachloroethane (U.S. Pat. No. 4,182,691 of Ueno et al, issued Jan. 8, 1980). In these examples, as far as solid $TiCl_3$ is used, however, only a part of the titanium can be utilized as an active catalyst and, consequently, there is not obtained such a high catalytic efficiency as to omit the polymer deashing step.

As a desirable method for raising the polymerization activity per unit titanium, on the other hand, it has been known to disperse and support titanium compounds on other solids. Actually, in the production of polyethylene by middle or low pressure process, a high catalytic efficiency can be achieved by the use of a catalyst system comprising a titanium catalyst component (titanium compounds on various supports) and an organo aluminum compound component. A polymeric product of good quality can be produced on a commercial scale without a polymer deashing step. However, in the polymerization of higher α-olefins, e.g., propylene, a high polymerization activity as well as a high stereoregularity are required, resulting in a more difficult problem than in the case of producing polyethylene by middle or low pressure process.

Of late, various improved methods have been proposed as to the stereoregular polymerization of α-olefins using a catalyst system comprising a supported titanium catalyst component and an organo aluminum catalyst component. Typical methods thereof are as follows:

1. A method comprising using a catalyst system comprising a solid supported titanium catalyst component obtained by cogrinding anhydrous $MgCl_2$, $TiCl_4$ and an electron donor, e.g., an organic acid ester, or a complex of $TiCl_4$ and such electron donor, and an organo aluminum catalyst component comprising an aluminum compound and electron donor (U.S. Pat. Nos. 4,107,413, issued Aug. 15, 1978; 4,107,414, issued Aug. 15, 1978; 4,156,063, issued May 22, 1979; 4,187,196, issued Feb. 6, 1980; and 4,226,963, issued Oct. 7, 1980, all of Giannini et al);

2. A method comprising using a catalyst system comprising a supported titanium catalyst component, obtained by ball milling anhydrous $MgCl_2$ and an electron donor (and a silicon compound) and contacting with $TiCl_4$ with heating to support the titanium compound, with catalyst component of an organo aluminum compound and electron donor (British Pat. No. 1,492,618, published Nov. 23, 1977, of Mitsui Petrochemical Industries Ltd. and U.S. Pat. No. 4,226,741, issued Oct. 7, 1980 of Luciani et al).

In addition to these methods, there has also been proposed, by way of further example, a method comprising using a catalyst system comprising a supported titanium catalyst component, prepared by treating with a solution of an organic acid ester, a titanium-containing solid obtained by heat treating $MgCl_2.mROH$ in $TiCl_4$, and an organo aluminum compound component (Japanese Patent Public Disclosure No. 57789/1976), but this method is insufficient in eliminating polymer deashing.

The inventors have made various studies on the supported titanium catalysts used in the above-described prior art methods and, consequently, have found that these methods have various disadvantages. That is to say, the method (1) is advantageous in that the titanium-containing compound component can effectively be utilized and handling thereof is easy, but produces inadequate results in overall polymerization activity and stereoregularity for omitting the steps of polymer deashing and removing amorphous polymer products. The surface area of the supported titanium catalyst component thus produced is small, as described in U.S. Pat. Nos. 4,107,413, issued Aug. 15, 1978; 4,107,414, issued Aug. 15, 1978; 4,156,063, issued May 22, 1979; 4,187,196, issued Feb. 6, 1980; and 4,226,963, issued Oct. 7, 1980, all of Giannini et al.

In the method (2), a large excess of $TiCl_4$ is used for supporting, so steps for recovering and purifying the same are required. It is difficult to remove completely free $TiCl_4$ adhered to the support after being supported. If this removal is not sufficiently effected, the polymerization activity and stereoregularity are unfavorably affected and in order to prevent this, it is necessary to provide a multistage washing step, which is disadvantageous commercially.

The inventors have continually made efforts to solve the problems on these supported titanium components, and have thus reached the present invention.

SUMMARY OF THE INVENTION

That is to say, the present invention provides a supported titanium catalyst component which is prepared by treating a titanium-containing solid with a hydrocarbon, organo halogen compound, e.g., a halogen-substituted hydrocarbon, or mixture thereof with heating, the titanium-containing solid being obtained by subjecting a system consisting of, in combination, a magnesium halide, ordinarily, magnesium dihalide, an organic acid ester and tetravalent titanium halide to a cogrinding and/or contacting treatment. According to this treatment, the properties and reactivity of the supported titanium catalyst component are completely modified as compared with those before the treatment.

In addition, the present invention provides a process for the stereoregular polymerization of α-olefins wherein homopolymerization or copolymerization of α-olefins with a high polymerization activity and excellent stereoregularity can favorably be accomplished on a commercial scale even in the presence of a molecular weight regulator such as hydrogen by mixing and combining the above-described supported titanium catalyst component with an organo aluminum catalyst component.

DETAILED DESCRIPTION OF THE INVENTION

Figure 1:
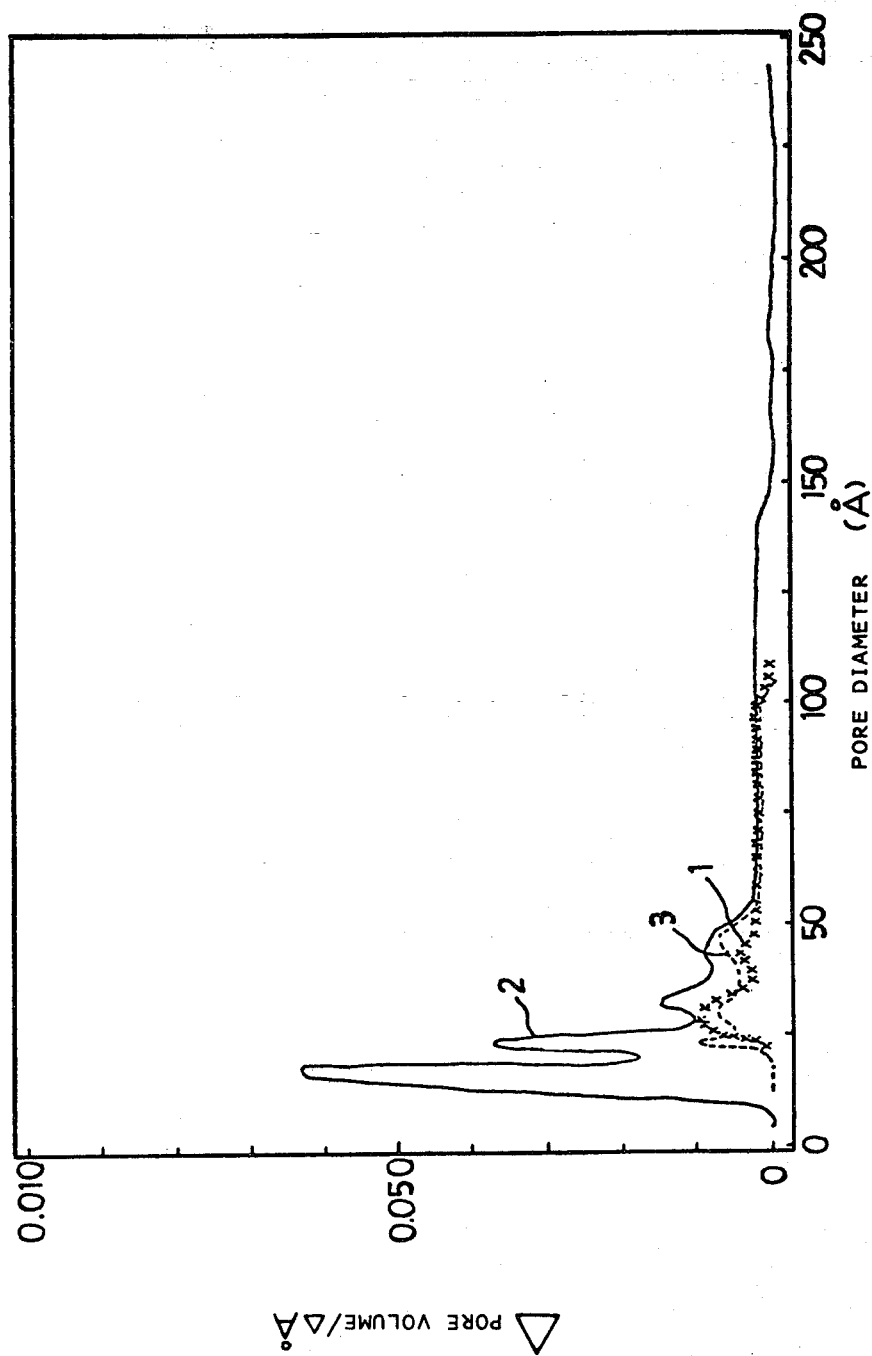
FIG. 1 is a diagram showing the distribution of pores of supported titanium catalyst components, in which Curve 1 shows that of the titanium-containing solid in Example 1, Curve 2 shows that of the supported titanium catalyst component in Example 1 (activation treatment (s)) and Curve 3 shows that of Comparative Example 1.

Suitable examples of magnesium dihalides used in the present invention are $MgCl_2$, $MgBr_2$ and $MgI_2$. Above all, $MgCl_2$ is preferable. These magnesium dihalides may be those synthesized by any method and commercially sold compounds can, of course, be used. It is desirable that the magnesium dihalides are as anhydrous as possible and, prior to their use, are preferably subjected to a dehydration treatment in conventional manner, for example, by firing (calcining, baking) at a temperature of 100° C. to 400° C. under reduced pressure for 1 to 10 hours. Such treatment results in the presence of water in such an extent that the catalytic performance is not affected.

Typical examples of the tetravalent titanium halide used in the present invention are $TiCl_4$, $TiBr_4$ and $TiI_4$. However, it is not always necessary that all the anions of these titanium halides be halogens; but a part thereof can be substituted by alkoxy, acyloxy or alkyl groups. Of course, $TiCl_4$ is preferred for use in preparing catalysts for stereoregular (co)polymerization of higher α-olefins, e.g., propylene.

The organic acid esters used in the present invention are esters of aliphatic, alicyclic and aromatic mono- or polycarboxylic acids and aliphatic, alicyclic and araliphatic mono- or polyols. Examples of these esters are butyl formate, ethyl acetate, butyl acetate, ethyl acrylate, ethyl butyrate, isobutyl isobutyrate, methyl methacrylate, diethyl maleate, diethyl tartrate, ethyl hexahydrobenzoate, ethyl benzoate, ethyl p-methoxybenzoate, methyl p-methylbenzoate, ethyl p-tert-butylbenzoate, dibutyl phthalate and ethyl α-naphthoate. The organic acid esters of the present invention are not intended to be limited to these examples. Above all, alkyl esters of aromatic carboxylic acids, in particular, $C_1$ to $C_8$ alkyl esters of benzoic acid or derivatives thereof are preferably used.

A titanium-containing solid used in the present invention can be prepared by the following various methods. That is, the copulverizing (cogrinding) and/or contacting treatment of a system consisting of a combination of a magnesium dihalide, tetravalent titanium halide and organic acid ester is preferebably carried out by mechanical grinding using a vibrating mill, ball mill, etc., with selecting any of combinations of:

(i) mixtures of (a) magnesium dihalides, (b) tetravalent titanium halides and (c) organic acid esters;
(ii) (b) and a composite or complex material (d) formed by contacting previously (a) and (c);
(iii) (a) and a composite or complex material (e) formed by contacting previously (b) and (c); and
(iv) (d) and (e).

The mechanical grinding efficiency depends on the grinding system, the structure of an apparatus used, the quantity of starting materials charged, voids, temperatures, etc. The grinding time is generally 1 to 200 hours, preferably 10 to 100 hours. As occasion demands, a method of supporting titanium can be used which comprises subjecting (a) and (c), above to a cogrinding treatment to obtain a solid which is then contacted with a tetravalent titanium halide.

The quantity of a titanium halide on a support is preferably 0.1 to 10% by weight as titanium metal. An organic acid ester is used in a proportion of 0.1 to 10 mols, preferably 0.5 to 5 mols per 1 gram atom of the supported titanium metal. The titanium-containing solid obtained in this way normally has a small surface area, i.e., at most about 10 $m^2/g$ and a micropore volume of less than about 0.05 cc/g only.

Then, in accordance with the present invention, this titanium-containing solid is treated for activation by heating with a hydrocarbon and/or organo halogen compound. The hydrocarbon which can be used in the present invention is dehydrated in conventional manner and includes unsubstituted hydrocarbons having 9 to 20 carbon atoms. More particular, they include aliphatic hydrocarbons having 3 to 20 carbon atoms, such as propane, butane, isobutane, pentane, n-hexane, n-heptane, isooctane, decane and liquid paraffin, alicyclic hydrocarbons having 5 to 12 carbon atoms, such as cyclopentane, cyclohexane, methylcyclohexane, ethylcyclohexane, decalin, dimethyldecalin, and aromatic hydrocarbons having 6 to 12 carbon atoms, such as benzene, toluene, o-xylene, p-xylene, m-xylene, mixed xylenes, ethylbenzene, dimethylnaphthalene and tetralin. For the production of a catalyst component for the polymerization of α-olefins, aromatic hydrocarbons are removed as far as possible in the prior art, but in the present invention, aromatic hydrocarbons have no bad effect, but rather give useful effects. This is very interesting.

Typical examples of the organic halogen compound used in the present invention are halogen substituted, e.g., mono- and polyhalo substituted, products of aliphatic, alicyclic and aromatic hydrocarbons having 1 to 20 carbon atoms. By way of examples, these include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, n-propyl chloride, 1,2-dichloropropane, hexachloropropylene, octachloropropane, decabromobutane, chlorinated paraggins, chlorocyclopropane, tetrachlorocyclopentane, hexachloropentadiene, hexachlorocyclohexane, chlorobenzene, bromobenzene, o-dichlorobenzene, p-dichlorobenzene, hexachlorobenzene, benzotrichloride, p-chlorobenzotrichloride, etc. The present invention is not intended to be limited thereby.

Above all, those halogen-substituted hydrocarbons containing a number of halogen atoms or containing trichloromethyl groups are preferably used and in particular, it is most preferable to use completely polychlorine substituted aliphatic hydrocarbons having 1 to 4 carbon atoms, for example, carbon tetrachloride, hexachloroethane, octachloropropane and the like.

In addition to these halo-substituted hydrocarbons it is possible to use halo-substituted oxygen-containing compounds, for example, hexachloroacetone, chloroacetic acid esters, trichloroacetic acid esters and the like; however, these are not preferred.

These hydrocarbons and organo halogen compounds can be used individually or in combination and, prior to use, they are preferably subjected to a dehydrating treatment in a conventional manner.

The activation treatment of the titanium-containing solid with these hydrocarbons and/or organo halogen compounds is carried out under heating condition in an inert atmosphere, ordinarily, nitrogen atmosphere. The quantity of the hydrocarbons and/or organo halogen compounds used for the treatment of the titanium-containing solid can be chosen within a wide range, but, in general, the quantity of the former is 5 to 50 times as much as the weight of the titanium-containing solid and the quantity of the latter is 0.5 to 50 times as much as the weight of the titanium containing solid.

The temperature at which the treatment may be carried out is about 40° to 200° C., preferably about 60° to 120° C. When the organic compounds for the treatment has a low boiling point and a treatment at a high temperature is required, the treatment is preferably carried out by the use of an air tight pressure vessel such as an autoclave. The treatment time can be chosen within a wide range, but, in general, it is about 0.5 to 20 hours, preferably about 1 to 5 hours.

After the treatment, the mixture is subjected to filtration at a temperature of somewhat lower than the treatment temperature, for example, at about 50° to 80° C., washed several times with a fresh hydrocarbon solvent while keeping the temperature the same and then dried under reduced pressure.

The titanium halide and a part of the organic acid ester are extracted from the titanium-containing solid by the treatment of the present invention, thus changing the composition thereof. Selection of the extraction obtained depends upon the organic compound used.

On the other hand, the supported titanium catalyst component is subjected to a large change in physical properties by the above-described treatment. That is to say, micropores are newly formed by the treatment to increase largely the surface area and pore volume. In the X-ray analysis (50 KV × 45 mA, $CuK_\alpha$, Ni filter), a part of the characteristic absorption of the starting anhydrous magnesium halide loses its sharpness in the titanium-containing solid obtained by mechanical grinding or the like, so that the intensity is decreased the width is enlarged and a part of the peaks disappear. However, in the supported titanium catalyst component obtained by the treatment according to the present invention, there are found various features that the peak which sharpness is lost with a decreased strength and an enlarged width recovers again its sharpness to some extent and a part of the peaks disappearing once is recovered, which means that the resulting treated supported titanium catalyst component differs in properties from that before the treatment is performed. Such a marked modifying effect cannot be given by merely heating the titanium-containing solid obtained by mechanical grinding or the like only, or by subjecting the solid product to a treatment with the above-described hydrocarbon and/or organo halogen compound at room temperature only.

The supported titanium catalyst component thus markedly modified in composition and physical properties, in combination with an organo aluminum catalyst component, is capable of exhibiting effectively a catalytic performance to give a high activity as well as a high stereoregularity in the homopolymerization of α-olefins or copolymerization with ethylene or other α-olefins.

As an organo aluminum compound for the above-described organo aluminum catalyst component there is used ordinarily an organo aluminum compound represented by the general formula $R_mAlX_{3-m}$, wherein R represents an alkyl group or aryl group having 1 to 18 carbon atoms, X represents a halogen anion and m represents a suitable numeral within a range of $2 < m \leq 3$, or a mixture or a complex compound thereof. For example, trialkylaluminums are used. There are preferably used as an organo aluminum compound to be used jointly with the trialkylaluminums, alkylaluminum compounds having 1 to 18 carbon atoms, in particular, 2 to 6 carbon atoms, such as dialkylaluminum monohalides, monoalkylaluminum dihalides and alkylaluminum sesquichlorides, or mixtures or complex compounds thereof. Examples of preferred trialkylaluminums are trimethylaluminum, triethylaluminum, tripropylaluminum, and triisobutylaluminum. Examples of preferred dialkylaluminum monohalides are dimethylaluminum chloride, diethylaluminum chloride, diethylaluminum bromide, diethylaluminum iodide and diisobutylaluminum chloride. Examples of preferred monoalkylaluminum dihalides are methylaluminum dichloride, ethylaluminum dichloride, ethylaluminum dibromide, ethylaluminum diiodide and butylaluminum dichloride. An example of a preferred alkylaluminum sesquihalide is ethylaluminum sesquichloride. In particular, it is preferable to use triethylaluminum, triisobutylaluminum and as one to be used jointly with them, diethylaluminum chloride and ethylaluminum sesquichloride, or mixtures or complex compounds thereof, because these compounds are readily obtainable commercially and exhibit excellent effects.

When the above-described organo aluminum compound only is used with the supported titanium catalyst component for the polymerization of α-olefins in the presence of a molecular weight regulator such as hydrogen, however, the yield of a stereoregular polymer is remarkably decreased. This is disadvantageous commercially. Therefore, the above-described organo aluminum compound and an organic acid ester, in combination, are preferably used as the organo aluminum cocatalyst component of the present invention. A suitable organic acid ester may be the same as or different from used for the preparation of the supported titanium catalyst component described above and their ratio is chosen within a range of 0.1 to 10, preferably 1 to 5 gram atoms of Al per 1 mol of organic acid ester.

Preparation of such a composite is carried out by contacting an organo aluminum compound and organic acid ester, for example, by merely mixing them at room temperature or while using a suitable hydrocarbon, as set forth above, as a diluent. The organo aluminum catalyst component is ordinarily prepared before a polymerization reaction, but, in general, it is preferably used within 1 hour after the component is prepared since the stereoregularity is unfavorably affected if it is used after storage of the composite for a long time.

The catalyst system of the present invention can be used for the polymerization of α-olefins, in particular, for the stereospecific polymerization of α-olefins having 3 to 6 carbon atoms, for example, propylene, butene-1, 4-methyl-pentane-1 and hexene-1 and for the copolymerization of α-olefins with each other and/or with ethylene. This copolymerization includes random copolymerization and block copolymerization. In the case of using ethylene as a comonomer, its proportion is generally chosen within a range of up to 30% by weight, in particular, 1 to 15% by weight to α-olefins. A polymerization reaction using the catalyst system of the present invention is carried out under ordinary conventional polymerization conditions. The reaction is carried out in any of a gaseous phase and liquid phase, and for the reaction of liquid phase, any of inert hydrocarbons and liquid monomers can be used. A suitable solvent for the polymerization is selected from the foregoing hydrocarbons. The polymerization temperature is generally—80° C. to 150° C., preferably 40 to 100° C. The pressure ranges, for example, 1 to 40 atm. Control of the molecular weight during polymerization is carried out in conventional manner using hydrogen or other known molecular weight regulators.

The polymerization can be carried out continuously or batchwise. The organo aluminum catalyst component is, of course, utilized for the polymerization reaction and further serves to catch various catalyst poisons introduced into the system. Thus, it is necessary to control the additive quantity of the organo aluminum catalyst component considering the quantities of catalyst poisons contained in α-olefins, solvents or various gases, in particular, when using a high activity catalyst as in the present invention, and, ordinarily, the organo aluminum catalyst component is used so as to satisfy an Al/Ti atomic ratio of 1 to 2000, preferably 50 to 1000 based on titanium in the supported titanium catalyst component.

When polymerization is carried out according to the process of the present invention, the polymerization activity and stereoregularity are largely improved, and, consequently, the steps of removing the catalyst (deashing) and removing atactic polymers become unnecessary or the load thereon is markedly reduced. The process of the present invention is particularly important for the production of isotactic polypropylene, random copolymers of ethylene and propylene and block copolymers of propylene and ethylene.

The present invention will now be illustrated in detail by the following Examples without limiting the same, in which percents are to be taken as those by weight unless otherwise indicated. The polymerization activity or catalyst efficiency (which will hereinafter be referred to as "C.E.") is the quantity (g) of a polymer formed per 1 g of titanium in the catalyst. The heptane-insoluble component (which will hereinafter be referred to as "H.I.") to show the proportion of a crystalline polymer in the polymers means the residual quantity (% by weight) in the case of extracting the polymer product with boiling n-heptane for 6 hours by means of a Soxhlet extractor of an improved type. The melt flow rate (which will hereinafter be referred to as "MFR") is measured according to ASTM-D 1238.

PREPARATION EXAMPLE OF SUPPORTED TITANIUM CATALYST COMPONENT

Example 1

Figure 2:
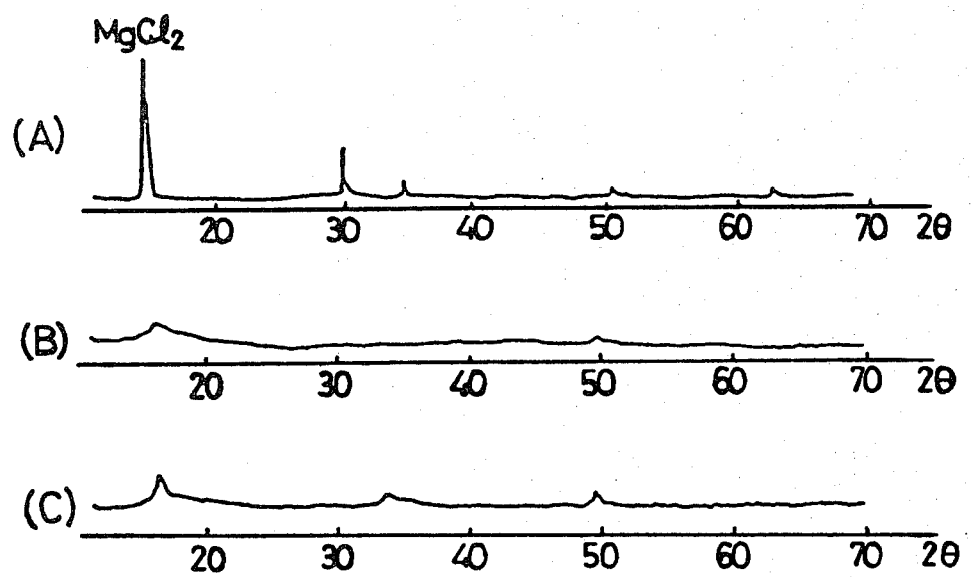
FIG. 2 is an X-ray diffraction diagram in which (A) shows that of $MgCl_2$, (B) shows that of the titanium-containing solid of Example 1 and (C) shows that of the supported titanium catalyst component of Example 1 (activation treatment (1)).

(a) Preparation of Titanium-containing Solid 40.3 g of magnesium dichloride (moisture content: 1% by weight) and 11.1 g of an equimolar composite of titanium tetrachloride and ethyl benzoate (which will hereinafter be referred to as "E.B.") (dehydration with $CaH_2$, nitrogen-substituted moisture content: 0.4% by weight) were charged in a stainless steel (SUS 32) mill pot with an inner volume of 300 ml carrying 100 stainless steel (SUS 32) balls with a diameter of 10 mm in a nitrogen atmosphere, which was then fitted to a shaker, followed by shaking for 20 hours to cogrind them. The thus obtained titanium-containing solid was yellow and had a composition of 20.5% Mg, 2.9% Ti, 68.4% Cl and 8.4% E.G. The specific surface area of the solid measured by the BET method was 10.8 $m^2/g$ and the pore volume was 0.032 cc/g, the distribution of the micropores being as shown in FIG. 1 (Cf. FIG. 1, Curve 1). The results of X-ray diffration (45 KV×45 mA, $CuK\alpha$, Filter Ni) of the solid are shown in FIG. 2. As can be seen therefrom, in the solid, the peaks of 14.8° (strong) and 50.3° (weak) of the characteristic peals (20) of anhydrous magnesium chloride become dull with increased widths and the peaks of 30.2° (middle), 34.8° (weak) and 63° (weak) disappear (Cf. FIG. 2, (B)).

(b) Activation Treatment (1)

7.7 g of the above-described titanium-containing solid was charged in a glass vessel of 300 ml, to which a solution of 7.5 g of hexachloroethane, equimolar to the magnesium dichloride in the coground product, in 77 ml of deoxidized dry n-heptane was added, and the mixture was stirred at 90° C. for 2 hours by means of a magnetic stirrer. Then, the mixture was filtered at 65° C. to separate soluble materials, washed repeatedly 4 times with 70 ml of new n-heptane while keeping the same temperature and dried under reduced pressure, thus obtaining a thin yellow solid with a yield of 92%. The so obtained solid had a composition of 22.2% Mg, 68.4% Cl, 8.2% E.B. and 1.2% Ti. The surface area and pore volume of the solid were respectively 133 $m^2/g$ and 0.12 cc/g, which were respectively 12 times and 3.2 times as much as those of the titanium-containing solid before the activation treatment (b). The distribution of pores is shown in FIG. 1 from which it is seen that a great number of pores are newly formed (FIG. 1, Curve 2). The X-ray diffraction diagram is as shown in FIG. 2. As can be seen from this diagram, both the peaks of 14.8° and 50.3°, which widths were increased and became dull by cogrinding, recover somewhat the sharpness and a peak with a large width reappears near 34.8° (FIG. 2, (C)).

(c) Activation Treatment (2)

Activation Treatment (1) was repeated except that the treatment was carried out at 120° C. instead of 90°

C. The resulting solid was thin yellow and had a Ti content of 1.0%.

Example 2

The activation treatment procedure (1) of Example 1 was repeated except carbon tetrachloride was used instead of the hexachloroethane. The resulting supported titanium treated solid had a titanium content of 1.3%.

Example 3

The activation treatment procedure (1) of Example 1 was repeated except 1,1,2-trichloroethane was used instead of the hexachloroethane. The resulting supported titanium treated solid had a titanium content of 1.1%.

Example 4

The activation treatment procedure (1) of Example 1 was repeated except p-chlorobenzotrichloride was used instead of the hexachloroethane, thus obtaining a supported titanium treated solid with a titanium content of 1.2%.

Example 5

The activation treatment procedure (1) of Example 1 was repeated except a solution of hexachloroethane in a mixed xylene was used instead of the solution of hexachloroethane in n-heptane, thus obtaining a supported titanium treated solid with a titanium content of 1.1%.

Example 6

The activation treatment procedure (1) of Example 1 was repeated except that hexachloroethane was not used. The resulting supported titanium treated solid was light yellow and had a titanium content of 1.1%, a surface area of 120 m²/g and a pore volume of 0.11 cc/g.

Example 7

The activation treatment procedure (1) of Example 1 was repeated except the same amount of mixed xylenes was used instead of the heptane to obtain a solid with a titanium content of 1.0%.

Comparative Example 1

5.0 g of the titanium-containing solid obtained in Example 1 (a) was charged in a glass vessel with a volume of 300 ml and subjected to a heating treatment at 90° C. for 2 hours in a nitrogen atmosphere. During the same time, decrease of the weight was small and the color of the solid was scarcely charged. The thus treated solid had a titanium content of 2.8%, a surface area of 14.5 m²/g and a pore volume of 0.038 cc/g, which were increased slightly in comparison with those before the treatment. The distribution of pores was scarcely changed as shown in FIG. 1 (Cf. FIG. 1, Curve 3).

Comparative Example 2

Treatment was carried out in an analogous manner to Example 1(b), activation treatment (1), except that the treatment was carried out at room temperature instead of the heating at 90° C., thus obtaining a supported titanium treated solid with a titanium content of 1.6%.

POLYMERIZATION EXAMPLES

Example 8

47.9 mg of the supported titanium catalyst solid component, after the treatment (Activation treatment (1)), obtained in Example 1 and having a titanium content of 1.2% was charged in nitrogen atmosphere into a stainless steel (SUS 32) autoclave with an inner volume of 1000 ml, equipped with a stirrer, to which a mixture of 3.44 ml of a solution of 1 mol/l of triethylaluminum (Al/Ti atomic ratio: 300) in n-heptane and 0.15 ml of E.B. (Al/E.B. molar ratio: 3.4) was added after 5 minutes from the preparation of the mixture. Further, 0.8 l of liquid propylene was added with 0.6 l of hydrogen gas as a molecular weight regulator. The temperature was then raised to 68° C. and polymerization was continued for 30 minutes. After the polymerization, the unreacted propylene was purged and 113 g of flowable powdered polypropylene was obtained, which corresponded to C.E. of PP 203,000 g/g-Ti and which had a HI of 90.5% and an MFR of 2.0.

Examples 9–13 and Comparative Examples 3–5

Polymerizations were carried out in an analogous manner to Example 8, except using the supported titanium catalyst solid components of Examples 2 to 6, the titanium-containing solid of Example 1(a) and the supported titanium catalyst solid compartments of Comparative Examples 1 and 2, all as set forth in Table Ia. The polymerization results are set forth in Table I(b).

TABLE I (a)

| Polymerization Example | Preparation Example | Ti Catalyst Component Ti/Support Ratio (%) | Quantity Used (mg) | Organo Al Cat Component Composition | Al/Ti (mol ratio) |
|---|---|---|---|---|---|
| Example 8 | Example 1 Activation Treatment (1) | 1.2 | 47.9 | TEAL/EB | 300 |
| Example 9 | Example 2 | 1.3 | 33.1 | TEAL/EB | 177 |
| Example 10 | Example 3 | 1.1 | 35.1 | TEAL/EB | 177 |
| Example 11 | Example 4 | 1.2 | 31.3 | TEAL/EB | 177 |
| Example 12 | Example 5 | 1.1 | 34.5 | TEAL/EB | 300 |
| Example 13 | Example 6 | 1.1 | 30.1 | TEAL/EB | 177 |
| Comp. Example 3 | Example 1 Ti-containing solid | 2.9 | 36.1 | TEAL/EB | 177 |
| Comp. Example 4 | Comp. Example 1 | 2.8 | 33.1 | TEAL/EB | 177 |
| Comp. Example 5 | Comp. Example 2 | 1.6 | 38.2 | TEAL/EB | 177 |

(b)

| | PP Yield (g) | C.E. (PP g/g-Ti) | H.I. (%) |
|---|---|---|---|
| Example 8 | 113 | 203,000 | 90.4 |
| Example 9 | 93.5 | 217,000 | 90.2 |
| Example 10 | 82.3 | 213,000 | 89.5 |
| Example 11 | 61.3 | 163,000 | 88.3 |
| Example 12 | 72.5 | 191,000 | 90.7 |
| Example 13 | 94.5 | 282,000 | 89.5 |
| Comp. Example 3 | 121 | 115,000 | 86.5 |
| Comp. | | | |

TABLE I-continued

| | | | |
|---|---|---|---|
| Example 4 Comp. | 127 | 137,000 | 81.6 |
| Example 5 | 108 | 177,000 | 83.2 |

Note:
Polymerization Condition: H₂ gas 0.6 l, Liquid Propylene 0.8 l, Al/Ester Molar Ratio 3.4, 68° C. × 0.5 hr.;
TEAL = Triethylaluminum, TIBAL = Triisobutylaluminum,
EB = Ethyl Benzoate

Examples 14 to 17 and Comparative Example 6

Polymerizations were carried out in an analogous manner to Example 8, except using the supported titanium catalyst solid components of Examples 1, 6 and 7 and the titanium-containing solid of Example 1(a) and using triisobutylaluminum in place of the triethylaluminum, all as set forth in Table II(a). The polymerization results are shown in Table II(b).

TABLE II (a)

| | Ti Catalyst Component | | | Organo Al Cat Component | |
|---|---|---|---|---|---|
| Polymerization Example | Preparation Example | Ti/Support Ratio (%) | Quantity Used (mg) | Composition | Al/Ti (mol ratio) |
| Example 14 | Example 1 Activation Treatment (1) | 1.2 | 41.2 | TIBAL/EB | 300 |
| Example 15 | Example 1 Activation Treatment (2) | 1.0 | 35.6 | TIBAL/EB | 300 |
| Example 16 | Example 6 | 1.1 | 41.6 | TIBAL/EB | 300 |
| Example 17 | Example 7 | 1.0 | 39.4 | TIBAL/EB | 300 |
| Comp. Example 6 | Example 1 Ti-containing solid | 2.9 | 33.5 | TIBAL/EB | 300 |

(b)

| | PP Yield (g) | C.E. (PP g/g-Ti) | H.I. (%) |
|---|---|---|---|
| Example 14 | 94.0 | 197,000 | 92.3 |
| Example 15 | 58.3 | 164,000 | 94.5 |
| Example 16 | 91.5 | 200,000 | 91.2 |
| Example 17 | 90.5 | 230,000 | 91.5 |
| Comp. Example 6 | 91.4 | 94,000 | 86.0 |

Note:
Polymerization Condition: H₂ gas 0.6 l, Liquid Propylene 0.8 l, Al/Ester Molar Ratio 3.4, 68° C. × 0.5 hr.;
TEAL = Triethylaluminum, TIBAL - Triisobutylaluminum,
EB = Ethyl Benzoate

Example 18

Example 8 was repeated except ethyl anisate was used in place of E.B. Polymerization results were: C.E.=PP 255,000 g PP/g-Ti; HI=91.1%.

Example 19

Example 8 was repeated except ethyl isobutyrate was used in place of E.B. The polymerization results were: C.E.=156,000 g PP/g-Ti; HI=90.3%.

Example 20

Example 8 was repeated except 4.5 g of ethylene was added to the autoclave prior to the commencement of the polymerization reaction. The ethylene/propylene copolymer ethylene content was 2.8% and MFR was 2.3. Polymerization results were C.E.=354,000 g/g-Ti; HI=85%.

What we claim is:

1. In a process for the stereoregular polymerization of α-olefins, wherein an α-olefin is contacted, under α-olefin (co)polymerization conditions, with a catalyst system comprising a titanium catalyst component and an organo aluminum catalyst component prepared by mixing an organo aluminum compound and an organic acid ester, the improvement comprising:
   the titanium catalyst component being obtained by co-grinding, in combination, a magnesium halide, a tetravalent titanium halide, and a carboxylic acid ester to obtain a titanium-containing solid product;
   treating said titanium-containing solid product by contacting at a temperature in the range of from about 40° C. to about 200° C. for about 0.5 to about 20 hours with a compound selected from one of a hydrocarbon which is present in an amount of from 5 to 50 times the weight of the titanium-containing solid and an organohalogen compound which is one of a halogen-substituted aliphatic, alicyclic and aromatic hydrocarbon having from 1 to 20 carbon atoms and is present in an amount of from about 0.5 to 50 times the weight of the titanium-containing solid.

2. The process of claim 1 wherein the organohalogen compound is a halogen-substituted aliphatic hydrocarbon.

3. The process of claim 1 wherein the halogen-substituted hydrocarbon is a polychloro-substituted aliphatic hydrocarbon having 1 to 4 carbon atoms.

4. The process of claim 1 wherein the titanium-containing solid product is treated with a mixture of said hydrocarbon and a halogen-substituted hydrocarbon.

5. The process of claim 4 wherein the halogen-substituted hydrocarbon is a polychloro-substituted aliphatic hydrocarbon having from 1 to 4 carbon atoms.

6. The process of claim 1 wherein said treatment of the titanium-containing solid product is carried out with heating at about 40° C. to about 200° C. for about 0.5 to about 20 hours.

7. The process of claim 1 wherein the polymerization temperature is in the range of 80° C. to 150° C. and the polymerization pressure is in the range of 1 to 40 atmospheres.

8. The process of claim 1 wherein the organoaluminum co-catalyst is present in an amount to provide an Al/Ti atomic ratio of 1:2000 based on titanium in the titanium catalyst.

* * * * *